(12) United States Patent
Georgiou

(10) Patent No.: US 7,564,855 B1
(45) Date of Patent: Jul. 21, 2009

(54) COMPREHENSIVE SIGNALING NODE AND METHOD, INCLUDING A PLURALITY OF SIGNALING ROUTINES

(75) Inventor: George A. Georgiou, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 916 days.

(21) Appl. No.: 10/822,970

(22) Filed: Apr. 13, 2004

(51) Int. Cl.
*H04L 12/28* (2006.01)
*G06F 17/30* (2006.01)
*G06F 15/173* (2006.01)

(52) U.S. Cl. ............... 370/401; 370/329; 370/351; 370/393; 370/395.2; 370/470; 726/27; 709/223; 709/224; 709/225; 709/226

(58) Field of Classification Search ........... 370/260, 370/352, 410, 329, 351, 393, 395.2, 401, 370/470; 726/26–33; 709/223–226
See application file for complete search history.

(56) References Cited

U.S. PATENT DOCUMENTS

| | | | |
|---|---|---|---|
| 6,253,249 B1 | 6/2001 | Belzile | |
| 6,650,633 B1 * | 11/2003 | Albers et al. | 370/352 |
| 6,987,849 B2 * | 1/2006 | Ravishankar | 379/229 |
| 7,003,280 B2 * | 2/2006 | Pelaez et al. | 455/406 |
| 7,006,508 B2 * | 2/2006 | Bondy et al. | 370/410 |
| 7,092,493 B2 * | 8/2006 | Hou et al. | 379/35 |
| 7,106,741 B2 * | 9/2006 | Dianda | 370/393 |
| 7,209,473 B1 * | 4/2007 | Mohaban et al. | 370/352 |
| 7,266,611 B2 * | 9/2007 | Jabri et al. | 709/231 |
| 2001/0052081 A1 * | 12/2001 | McKibben et al. | 713/201 |
| 2001/0053694 A1 * | 12/2001 | Igarashi et al. | 455/433 |
| 2002/0027983 A1 | 3/2002 | Suzuki | |
| 2002/0051518 A1 * | 5/2002 | Bondy et al. | 379/35 |
| 2002/0080791 A1 | 6/2002 | Sylvain | |
| 2003/0053434 A1 * | 3/2003 | Chow et al. | 370/338 |
| 2003/0058839 A1 | 3/2003 | DSouza | |
| 2003/0099227 A1 | 5/2003 | Yoo | |
| 2003/0147397 A1 * | 8/2003 | Dianda | 370/395.2 |
| 2003/0169859 A1 * | 9/2003 | Strathmeyer et al. | 379/88.17 |
| 2003/0219103 A1 * | 11/2003 | Rao et al. | 379/32.05 |
| 2003/0231623 A1 | 12/2003 | Ryu et al. | |
| 2003/0231639 A1 | 12/2003 | Mikkola | |
| 2004/0008837 A1 | 1/2004 | Sylvain | |
| 2004/0071130 A1 * | 4/2004 | Doerr et al. | 370/352 |
| 2004/0165709 A1 * | 8/2004 | Pence et al. | 379/201.01 |
| 2004/0219911 A1 * | 11/2004 | Kouchri et al. | 455/423 |
| 2005/0073964 A1 * | 4/2005 | Schmidt et al. | 370/260 |
| 2005/0096029 A1 * | 5/2005 | Pelaez et al. | 455/419 |
| 2006/0176840 A1 * | 8/2006 | Bloch et al. | 370/315 |

* cited by examiner

*Primary Examiner*—Edan Orgad
*Assistant Examiner*—Venkatesh Haliyur

(57) ABSTRACT

A comprehensive signalling node is provided according to an embodiment of the invention. The comprehensive signalling node includes a signalling interface adapted for transmitting and receiving signalling communications and a storage system configured to store a Media Gateway Controller (MGC) routine, to store a Session Initiation Protocol (SIP) routine, to store a Session Border Controller (SBC) routine, to store a Push-To-Talk (PTT) routine, to store a H.323 routine, to store a Wide Area Network (WAN) compression routine, and to store a Communication Assistance for Law Enforcement (CALE) routine. The comprehensive signalling node further includes a processing system that is configured to receive a signalling communication through the signalling interface, process the signalling communication with the MGC routine if appropriate, with the SIP routine if appropriate, with the SBC routine if appropriate, with the PTT routine if appropriate, with the H.323 routine if appropriate, with the WAN compression routine if appropriate, or with the CALE routine if appropriate.

18 Claims, 4 Drawing Sheets

COMPREHENSIVE SIGNALING NODE AND METHOD, INCLUDING A PLURALITY OF SIGNALING ROUTINES

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to a comprehensive signalling node and method, including a plurality of signalling routines.

2. Description of the Prior Art

Many communication networks exist for conducting communications between electronic devices and/or persons. One area of rapid development is in the interfacing of communications devices to various networks and in the interfacing between networks. The interfacing typically involves performing communication protocol translations, as each communication network may operate according to a specific or unique communication protocol. In addition, the interfacing can relay communications between disparate network types. For example, the interfacing can relay communications between a connection-type network and a connectionless network. Examples of a connection-type network are a Public Switched Telephone Network (PSTN) and an optical fiber network, for example. Examples of a connectionless network are packet-based networks, such as an Internet Protocol (IP) network, for example.

One continuing concern in communication networks is providing fast, efficient, and trouble-free data communications. One area of particular concern and difficulty is in conducting communications between devices or networks that employ differing communications protocols. For example, with the advent of Voice Over Internet Protocol (VOIP) telecommunications, wherein voice telephone calls are conducted at least partially over packet-based networks, a particular communication session may transmit data over both a connection-type network and a connectionless network. Such communications typically necessitate a device called a gateway that interfaces between a device and a network, between a first device and a second device (across a network), or between a first network and a second network.

FIG. 1 is a diagram of a communication gateway scenario according to the prior art. The prior art communication network can include (or communicate with) multiple gateways, such as the gateways A1, A2, B1, B2, and B3. Controller A communicates with and controls the gateways A1 and A2, while controller B communicates with and controls the gateways B1-B3. Each gateway (and controller) receives signalling requests for conducting a communication session and provides routing information that enables the completion of the requested communication session. For example, a device signalling for and requesting a communication session can comprise a VOIP telephone, and the particular gateway could comprise a Session Initiation Protocol (SIP) gateway that sets up a communication session with another VOIP telephone in the communication network. Alternatively, the particular gateway could comprise a media gateway controller (MGC), a push-to-talk (PTT) gateway, etc.

In a similar vein, the communication network can include other gateway controllers for different communication protocol interfacing operations and gateways built by other manufacturers. For example, controller A and gateways A1 and A2 could be obtained from a first equipment manufacturer, while controller B and gateways B1-B3 could be obtained from a second equipment manufacturer. Each manufacturer typically builds gateway devices and a gateway controller (such as a MGC) for their own network equipment. The result is that as the prior art communication network is built and evolves, the prior art communication network typically includes gateways of different manufacturers and consequently requires multiple, corresponding gateway controllers. Each set of gateways, and the corresponding controller/MGC, operate independently of those of other manufacturers. This proliferation of different, non-integrated devices results in increased difficulty and complexity for the network provider.

One consequence is that there is no coordination between the various gateways and controllers. Another consequence is that the disparate and separate controllers do not process common data, and therefore system personnel of the communication network cannot access overall data gathering/reporting. Yet another consequence is that installation, configuration, and maintenance of individual signalling routines and the corresponding gateway controller are done independently for each subsystem in the communication network. Still another consequence is that upgrades or removal of network components are likewise performed independently. Furthermore, the end consequence is increased cost to build the communication network due to the need to purchase and maintain multiple individual signalling routines and gateway controllers.

SUMMARY OF THE INVENTION

The invention helps solve the above problems

A comprehensive signalling node is provided according to an embodiment of the invention. The comprehensive signalling node comprises a signalling interface adapted for transmitting and receiving signalling communications. The comprehensive signalling node further comprises a storage system configured to store a Media Gateway Controller (MGC) routine, to store a Session Initiation Protocol (SIP) routine, to store a Session Border Controller (SBC) routine, to store a Push-To-Talk (PTT) routine, to store a H.323 routine, to store a Wide Area Network (WAN) compression routine, and to store a Communication Assistance for Law Enforcement (CALE) routine. The comprehensive signalling node further comprises a processing system in communication with the signalling interface and the storage system. The processing system is configured to receive a signalling communication through the signalling interface, process the signalling communication with the MGC routine if appropriate, process the signalling communication with the SIP routine if appropriate, process the signalling communication with the SBC routine if appropriate, process the signalling communication with the PTT routine if appropriate, process the signalling communication with the H.323 routine if appropriate, process the signalling communication with the WAN compression routine if appropriate, or process the signalling communication with a Communication Assistance for Law Enforcement (CALE) routine if appropriate.

A method of operating a comprehensive signalling node is provided according to an embodiment of the invention. The method comprises receiving a signalling communication. The method further comprises processing the signalling communication with a Media Gateway Controller (MGC) routine if appropriate, processing the signalling communication with a Session Initiation Protocol (SIP) routine if appropriate, processing the signalling communication with a Session Border Controller (SBC) routine if appropriate, processing the signalling communication with a Push-To-Talk (PTT) routine if appropriate, processing the signalling communication with a H.323 routine if appropriate, processing the signalling communication with a Wide Area Network (WAN) compression routine if appropriate, and processing the signalling communication with a Communication Assistance for Law Enforcement (CALE) routine if appropriate.

A comprehensive signalling node software product is provided according to an embodiment of the invention. The comprehensive signalling node software product comprises a control software configured to direct a processing system to receive a signalling communication, process the signalling communication with a Media Gateway Controller (MGC) routine if appropriate, process the signalling communication with a Session Initiation Protocol (SIP) routine if appropriate, process the signalling communication with a Session Border Controller (SBC) routine if appropriate, process the signalling communication with a Push-To-Talk (PTT) routine if appropriate, process the signalling communication with a H.323 routine if appropriate, process the signalling communication with a Wide Area Network (WAN) compression routine if appropriate, or process the signalling communication with a Communication Assistance for Law Enforcement (CALE) routine if appropriate. The comprehensive signalling node software product further comprises a storage system that stores the control software.

BRIEF DESCRIPTION OF THE DRAWINGS

The same reference number represents the same element on all drawings.

DETAILED DESCRIPTION OF THE PREFERRED EMBODIMENT

Figure 1:
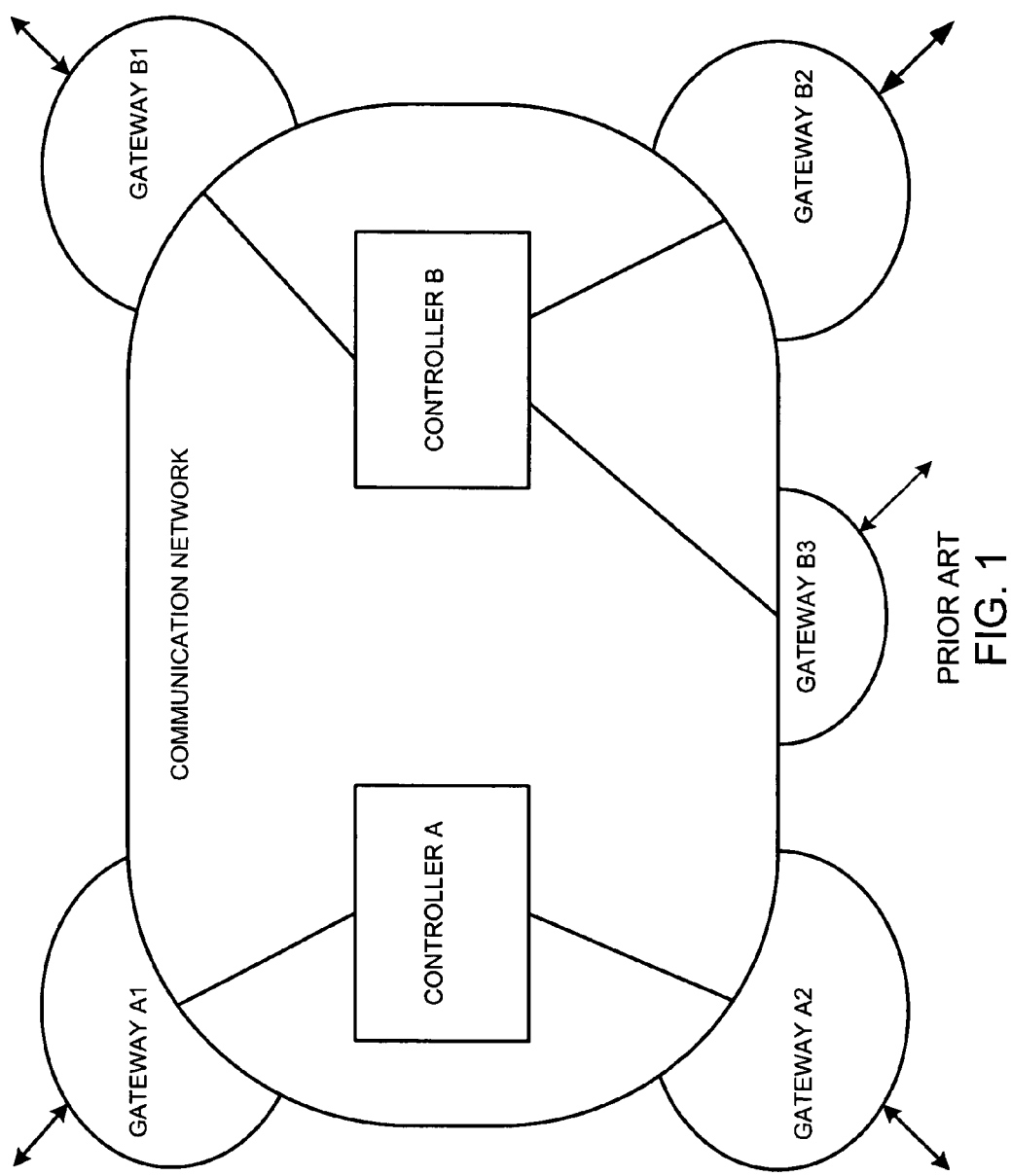
FIG. 1 is a diagram of a communication gateway scenario according to the prior art.
Figure 2:
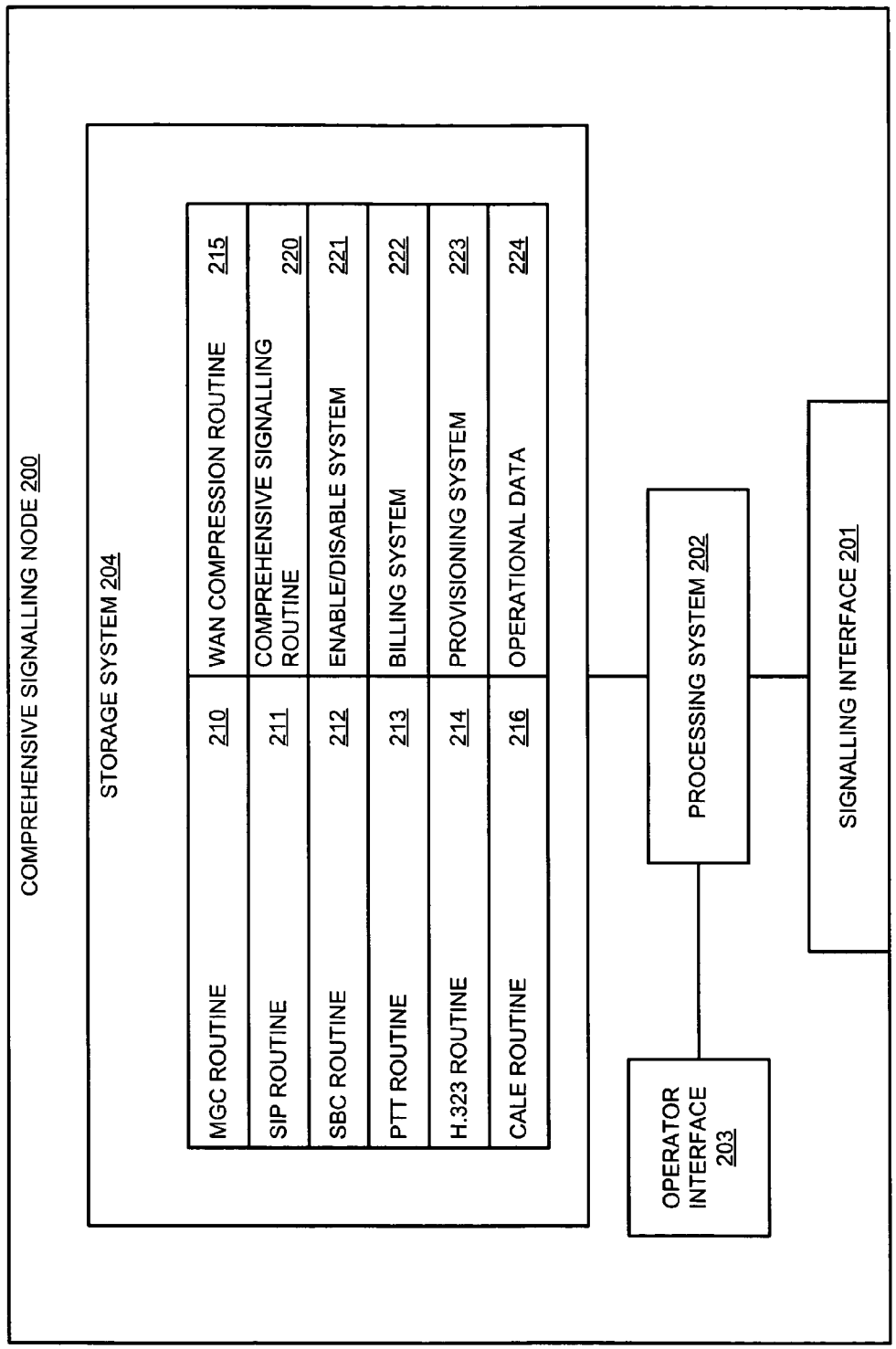
FIG. 2 shows a comprehensive signalling node according to an embodiment of the invention.
Figure 3:
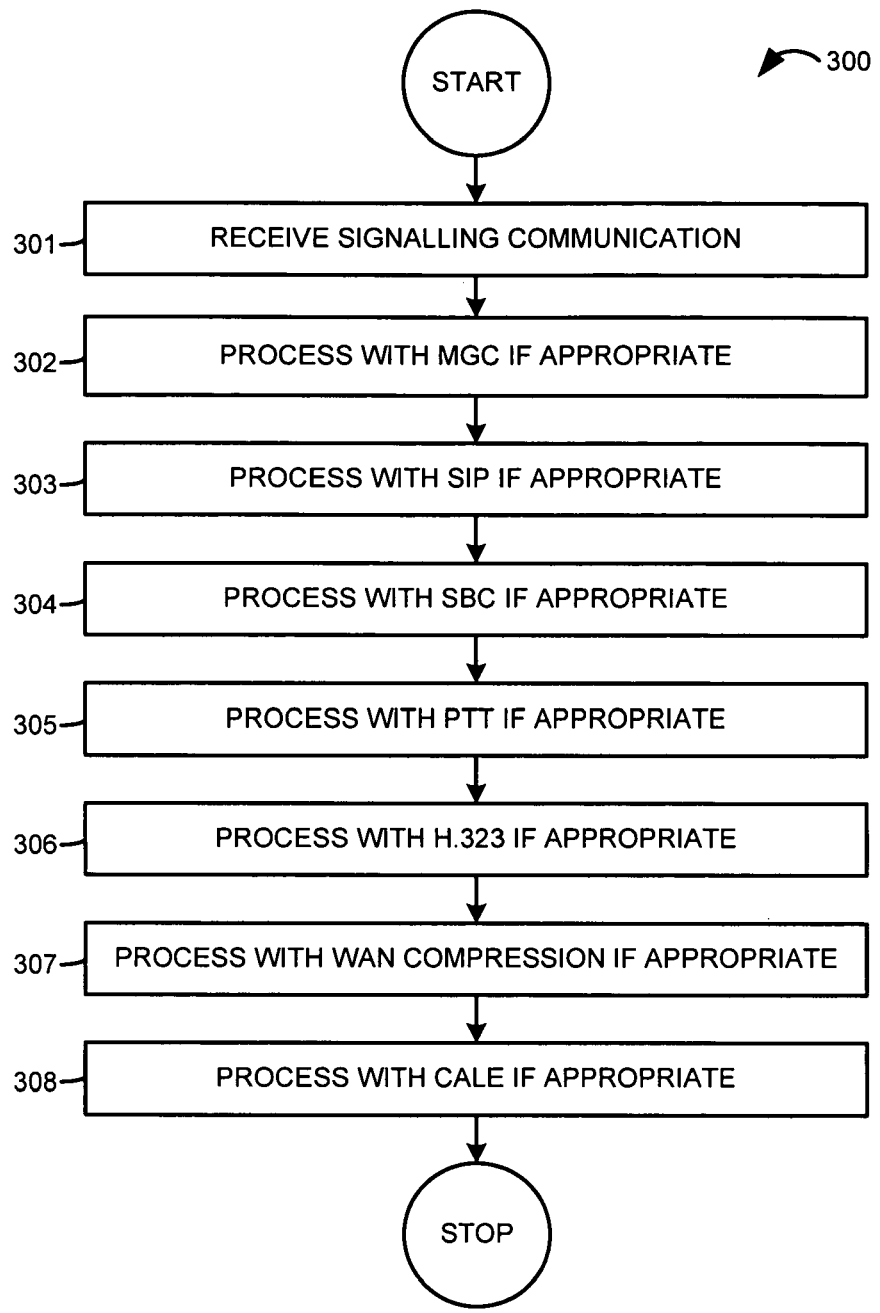
FIG. 3 is a flowchart of a method of operating a comprehensive signalling node according to an embodiment of the invention.
Figure 4:
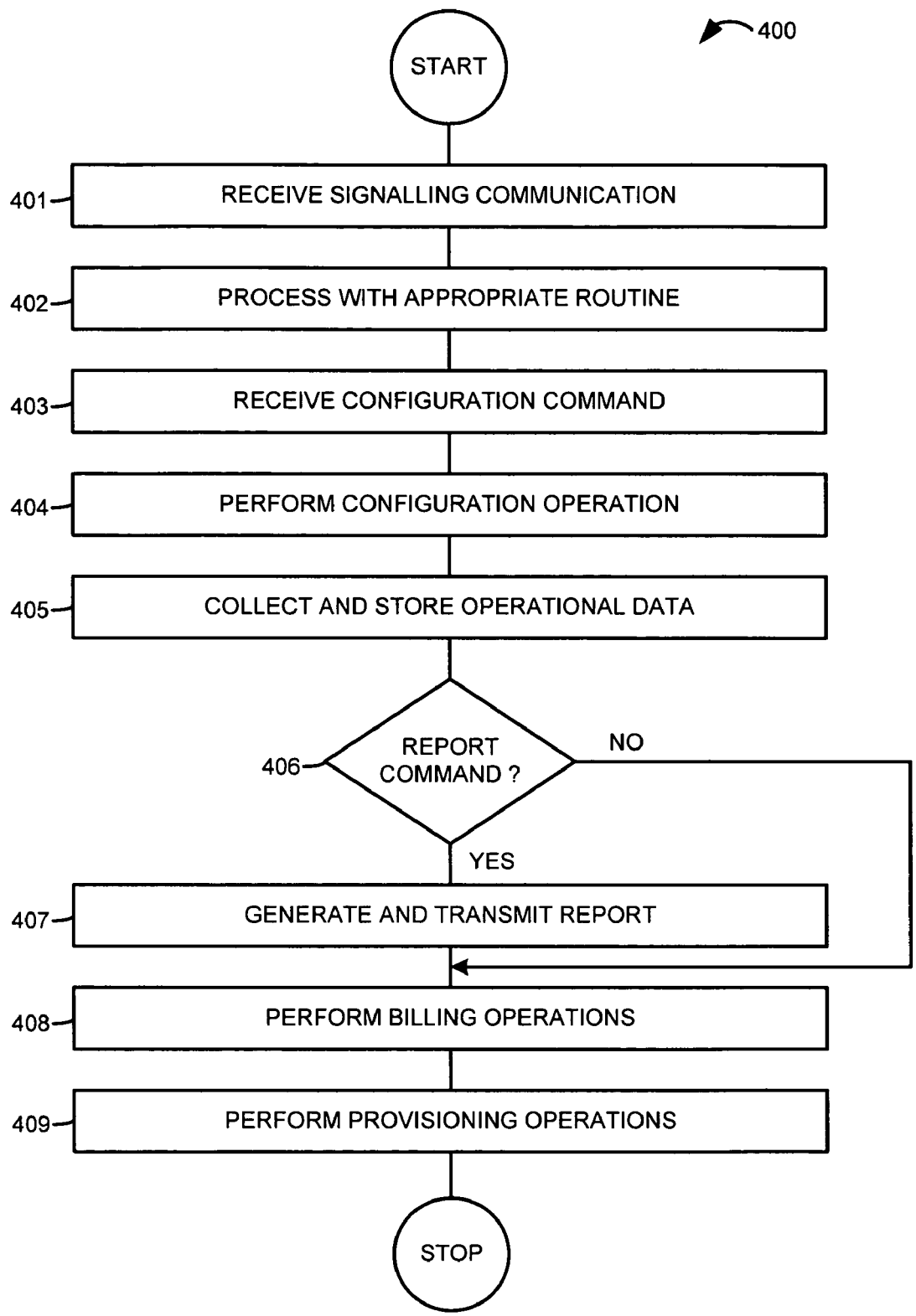
FIG. 4 is a flowchart of a method of operating a comprehensive signalling node according to another embodiment of the invention.

FIGS. 2-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 shows a comprehensive signalling node 200 according to an embodiment of the invention. The comprehensive signalling node 200 includes a signalling interface 201, a processing system 202, an operator interface 203, and a storage system 204. The processing system 202 is connected to the signalling interface 201, to the operator interface 203, and to the storage system 204.

The storage system 204 can comprise a disk, tape, integrated circuit, server, or some other memory device. The storage system 204 can be distributed among multiple memory devices. The storage system 204 can store a plurality of signalling routines, such as a Media Gateway Controller (MGC) routine 210, a Session Initiation Protocol (SIP) routine 211, a Session Border Controller (SBC) routine 212, a Push-To-Talk (PTT) routine 213, a H.323 routine 214, a Wide Area Network (WAN) compression routine 215, and a Communication Assistance for Law Enforcement (CALE) routine 216, for example. In addition, the storage system 204 can store a comprehensive signalling routine 220, operational data 224, an enable/disable system 221, a billing system 222, and a provisioning system 223.

It should be understood that other or additional signalling routines can be included. Further, it should be understood that the above software routines can alternatively comprise specialized hardware or circuitry.

The comprehensive signalling node 200 comprises a communication network device that comprehensively controls signalling for at least a portion of an associated communication network. In order to comprehensively control signalling operations, the comprehensive signalling node 200 manages operations of the multiple signalling routines 210-216 and interfaces between communication protocols using the signalling routines 210-216. In addition, the comprehensive signalling node 200 can provide differentiated network services. Fore example, the comprehensive signalling node 200 can bill more for certain communication services. Moreover, the comprehensive signalling node 200 can provide bandwidth optimization and cost reduction. In one embodiment, the comprehensive signalling node 200 can comprise a management system for managing soft switches or gateway controllers of various types and manufacturers, among other things.

A gateway is a term that is commonly used for a node that connects two different and otherwise incompatible communications devices and/or communications networks. A soft switch is a programmable switch that can be configured and re-configured and that performs communication switching. One or more soft switches are typically under the control of a signalling controller.

One type of signalling controller is a Media Gateway Controller (MGC), for example. A MGC can receive signalling for a communication, process the signalling to produce a routing for the communication, perform protocol control and conversion, and signal an associated gateway or gateway device to perform specified operations. The operations can include routing, protocol conversion, security measures, etc.

The signalling routines 210-216 can be used to interface between a variety of communication devices, between a variety of communication networks, or between a particular communication device and a particular communication network. For example, a particular signalling routine could interface between a Public Switched Telephone Network (PSTN) and an Internet Protocol (IP) network. Operations of the signalling routines 210-216 are individually discussed below. It should be understood that any of the software routines can be replaced by equivalent hardware circuits.

The signalling interface 201 sends and receives signalling communications between the comprehensive signalling node 200 and other network components, other network devices, or other communications networks. The signalling interface 201 can be connected to and can communicate with switched networks, such as a PSTN, optical fiber networks, etc. The signalling interface 201 can be connected to and can communicate with packet-based networks, such as IP based networks, including wireline and wireless packet-based networks. The signalling interface 201 therefore can communicate according to a Signalling System 7 (SS7) signalling protocol, according to an Internet Protocol (IP), etc.

The processing system 202 can comprise a computer microprocessor, logic circuit, or some other processing device. The processing system 202 can be distributed among multiple processing devices. The processing system 202 retrieves and executes the comprehensive signalling routine 220 from the storage system 204. The comprehensive signalling routine 220 can comprise an application program, firmware, or some other form of machine-readable processing instructions. When executed by the processing system 202, the comprehensive signalling routine 220 directs the processing system 202 to operate in accord with the invention. In addition, the processing system 202 executes the signalling routines 210-216, where each signalling routine comprises a software routine in the storage system 204. The processing system 202, under the direction of the comprehensive signalling routine 220, can enable and disable individual signalling routines. The processing system 202, under the direction of the comprehensive signalling routine 220, can receive and store operational data from the signalling routines 210-216 into the operational data 224. The operational data 224 can comprise operating statistics and data for each signalling routine 210-216.

The operator interface 203 can comprise a keyboard, mouse, voice recognition interface, graphical display, touchscreen, or some other type of user device. The operator interface 203 can be used by an operator to access and operate the comprehensive signalling node 200. The processing system 202 can receive operator inputs through the operator interface 203. The operator inputs can include, among other things, enable/disable inputs, information display requests of the operational data, etc. In addition, the processing system 202 can generate outputs to the operator through the operator interface 203, such as displaying current enable and disable states for each signalling routine, displaying gateway data and histories, etc.

The MGC routine 210 performs a Media Gateway Control Protocol (MGCP) signalling. MGCP is a specification that enables operation of a physically decomposed gateway (i.e., a protocol converter), the components of which may be distributed across multiple physically distinct devices. One common use of MGCP is in a soft switch. MGCP enables external control and management of data communications equipment operating at the edge of emerging multi-service packet networks. MGCP media gateways operate under the control of Media Gateway Controllers (MGCs), which handle their registration and the management of their resources.

The SIP routine 211 performs Session Initiation Protocol (SIP) or SIP for telephony (SIP-T) signalling. SIP is an application layer protocol for the establishment, modification, and termination of conferencing and telephony sessions over IP-based networks. SIP can be used to connect a PSTN telephone call to an IP address on a packet network.

The SBC routine 212 performs a session border control function. The SBC routine 212 can perform border control between devices and networks or between networks. The SBC routine 212 can provide device security and firewall capabilities, perform Network Address Translation (NAT), etc.

The PTT routine 213 performs a push-to-talk signalling. Push-to-talk is a communication protocol that can be used for wireless communications. In addition, PTT can be used for IP telephony in order to accommodate latency in packet-based networks.

The H.323 routine 214 performs H.323 protocol signalling. The H.323 standard includes a set of standards defining real-time multimedia communications for packet-based networks, including IP telephony.

The WAN compression routine 215 performs data compression. The compression can be performed in order to optimize communications over particular links of a packet-based network.

The CALE routine 216 performs communication functions for law enforcement personnel. For example, the CALE routine 216 can enable wiretapping and communication intercept functions.

In addition to managing the plurality of signalling routines 210-216, the comprehensive signalling node 200 can perform other tasks. The comprehensive signalling node 200 can record operational data from the signalling routines 210-216. The operational data can be useful for managing operations, traffic routing and balancing, and troubleshooting of the signalling routines or associated networks. The comprehensive signalling node 200 can perform billing for the signalling routines 210-216. The comprehensive signalling node 200 can perform comprehensive billing operations for all signalling operations. The comprehensive signalling node 200 can perform provisioning for the signalling routines 210-216.

The comprehensive signalling node 200 is further useful for enabling and/or disabling the operation of specific signalling routines. For example, the comprehensive signalling node 200 can selectively enable or disable particular signalling routines, and can do so autonomously, such as at the direction of an operating software (such as the comprehensive signalling routine 220), or under operator control. In addition, the comprehensive signalling node 200 can enable or disable signalling routines in response to commands from a remote user or remote device.

The enable/disable system 221 can disable specific signalling routines of the comprehensive signalling node 200. For example, in one embodiment the comprehensive signalling node 200 can include all signalling routines that are likely to be used. The comprehensive signalling node 200 can then have specific signalling routines enabled, as desired by a customer, and the remaining signalling routines can be disabled. This may be more economical to manufacture, wherein the comprehensive signalling node 200 is configured before it is shipped to the customer. Later, upon payment of an upgrade fee, the manufacturer can remotely enable any additional signalling routines, without necessitating taking the comprehensive signalling node 200 out of service.

The billing system 222 can perform billing for use of any routines of the comprehensive signalling node 200. For example, a single customer could use the MGC routine 210, the SIP routine 211, and the PTT routine 213, and the billing system 222 could bill for use of all three of these routines.

The provisioning system 223 can provide provisioning for all routines of the comprehensive signalling node 200. For example, the provisioning system 223 can provision and configure all signalling routines that are enabled by the enable/disable system 221.

FIG. 3 is a flowchart 300 of a method of operating a comprehensive signalling node 200 according to an embodiment of the invention. The comprehensive signalling node 200 can include a plurality of signalling routines and can interface between a plurality of communication networks. In step 301, the comprehensive signalling node 200 receives a signalling communication.

In step 302, the comprehensive signalling node 200 processes the signalling communication using a media gateway controller (MGC) routine/function, if appropriate. Therefore, if the signalling communication conforms to a Media Gateway Control Protocol (MGCP), then step 302 is employed. Otherwise, the method proceeds to step 303.

In step 303, the comprehensive signalling node 200 processes the signalling communication using a SIP routine/function, if appropriate. Therefore, if the signalling communication conforms to the SIP Protocol, then step 303 is employed. Otherwise, the method proceeds to step 304.

In step 304, the comprehensive signalling node 200 processes the signalling communication using SBC routine/function, if appropriate. Otherwise, the method proceeds to step 305.

In step 305, the comprehensive signalling node 200 processes the signalling communication using a PTT routine/function, if appropriate. Otherwise, the method proceeds to step 306.

In step 306, the comprehensive signalling node 200 processes the signalling communication using a H.323 routine/function, if appropriate. Otherwise, the method proceeds to step 307.

In step 307, the comprehensive signalling node 200 processes the signalling communication using a WAN compression routine/function, if appropriate. Otherwise, the method proceeds to step 308.

In step 308, the comprehensive signalling node 200 processes the signalling communication using a CALE routine/function, if appropriate. Otherwise, the method exits.

FIG. 4 is a flowchart 400 of a method of operating a comprehensive signalling node 200 according to another embodiment of the invention. The comprehensive signalling node 200 can include a plurality of signalling routines and can interface between a plurality of communication networks. In step 401, the comprehensive signalling node 200 receives a signalling communication.

In step 402, the comprehensive signalling node 200 processes the signalling communication using an appropriate signalling routine, as previously discussed in steps 302-307 of FIG. 3.

In step 403, the comprehensive signalling node 200 receives a configuration command. The configuration command specifies an enable or disable operation for one or more specified routines of the MGC routine 210, the SIP routine 211, the SBC routine 212, the PTT routine 213, the H.323 routine 214, or the WAN compression routine 215. The configuration command can be received in, interpreted by, and acted on by the enable/disable system 221. The configuration command can be received from a remote computer device or remote user. Alternatively, the configuration command can be received through the operator interface 204 of the comprehensive signalling node 200.

In step 404, the comprehensive signalling node 200 performs the configuration operation of the configuration command, wherein the configuration operation enables or disables the one or more specified signalling routines.

In step 405, the comprehensive signalling node 200 collects and stores operational data from the signalling routines. The collecting and storing enables monitoring of operations of the comprehensive signalling node 200. Further, the collecting and storing enable troubleshooting of individual network components, and enables centralized billing operations.

In step 406, the comprehensive signalling node 200 determines whether a report command has been received. A report command prompts the comprehensive signalling node 200 to report some or all of the collected and stored operational data. The report command can specify the signalling routine/function(s) to be reported on, and can further specify the quantity of operational data to be reported. If a report command has been received, the method proceeds to step 407; otherwise, it branches to step 408.

In step 407, where a report command has been received, the comprehensive signalling node 200 reports the operational data that is specified in the report command.

In step 408, the comprehensive signalling node 200 performs billing operations. The billing operations can be performed for all operations of the signalling routines. The billing operations can be automatically performed, or can be initiated by a human operator.

In step 409, the comprehensive signalling node 200 performs provisioning operations. The provisioning can initialize, set up, and configure signalling routines. The provisioning operations can be performed for newly added or newly configured signalling routines. Alternatively, the provisioning operations can be performed for signalling routines that are being upgraded and/or re-configured.

The comprehensive signalling node, method, and software product according to the invention can be employed according to any of the embodiments in order to provide several advantages, if desired. The invention can interface between multiple gateway devices or gateway functions. The invention can interface between multiple networks. The invention can interface between gateways of different manufacturers. In addition, the invention can interface between gateway controllers of different manufacturers.

The invention enables comprehensive data collection, including collecting operational data from various signalling devices, signalling gateways, and gateway controllers. The invention enables comprehensive billing, including billing for use of various signalling devices, signalling gateways, and gateway controllers. The invention enables the provision of differentiated network services with different billing requirements. The invention enables comprehensive provisioning for network components/functions. The invention enables comprehensive enabling/disabling of specific network components/functions. Furthermore, the operational data can be useful for managing operations, traffic routing and balancing, and troubleshooting of the signalling routines or associated networks. Moreover, the invention enables bandwidth optimization and cost reduction.

What is claimed is:

1. A comprehensive signaling node, comprising:
 a signaling interface adapted for transmitting and receiving signaling communications between a communication network and a communication device, wherein the communication device is operated by a user;
 a storage system configured to store a Media Gateway Controller (MGC) routine, to store a Session Initiation Protocol (SIP) routine, to store a Session Border Controller (SBC) routine, to store a Push-To-Talk (PTT) routine, to store a H.323 routine, to store a Wide Area Network (WAN) compression routine, to store a Communication Assistance for Law Enforcement (CALE) routine and to store an enable/disable system; and
 a processing system in communication with the signaling interface and the storage system, with the processing system being configured to receive a signaling communication through the signaling interface;

to receive a configuration command, with the configuration command specifying an enable or disable operation for one or more specified signaling routines of the MGC routine, the SIP routine, the SBC routine, the PTT routine, the H.323 routine, the WAN compression routine, and the CALE routine, wherein the user determines the enable or disable operation for one or more specified signaling routines of the MGC routine, the SIP routine, the SBC routine, the PTT routine, the H.323 routine, the WAN compression routine, and the CALE routine;

to perform the configuration operation of the configuration command, wherein the configuration operation enables or disables the one or more specified signaling routines; and to process the signaling communication with the MGC routine if appropriate, to process the signaling communication with the SIP routine if appropriate, to process the signaling communication with the SBC routine if appropriate, to process the signaling communication with the PTT routine if appropriate, to process the signaling communication with the H.323 routine if appropriate, to process the signaling communication with the WAN compression routine if appropriate, or to process the signaling communication with the CALE routine if appropriate.

2. The comprehensive signaling node of claim 1, with the comprehensive signaling node further comprising an operator interface in communication with the processing system, and wherein the processing system is configured to receive the configuration command through the operator interface.

3. The comprehensive signaling node of claim 1, with the storage system being further configured to store operational data from the MGC routine, the SIP routine, the SBC routine, the PTT routine, the H.323 routine, the WAN compression routine, and the CALE routine.

4. The comprehensive signaling node of claim 1, with the storage system being further configured to store operational data from the MGC routine, the SIP routine, the SBC routine, the PTT routine, the H.323 routine, the WAN compression routine, and the CALE routine, and with the processing system being further configured to receive a report command and generate and transmit a report including operational data specified in the report command.

5. The comprehensive signaling node of claim 1, with the storage system being further configured to store a billing system and with the processing system being further configured to perform billing operations for the MGC routine, the SIP routine, the SBC routine, the PTT routine, the H.323 routine, the WAN compression routine, and the CALE routine.

6. The comprehensive signaling node of claim 1, with the storage system being further configured to store a provisioning system and with the processing system being further configured to perform provisioning operations for the MGC routine, the SIP routine, the SBC routine, the PTT routine, the H.323 routine, the WAN compression routine, and the CALE routine.

7. A method of operating a comprehensive signaling node for transmitting and receiving signaling communications between a communication network and a communication device, wherein the communication device is operated by a user, comprising:

receiving a signaling communication;

receiving a configuration command in the comprehensive signaling node, with the configuration command specifying an enable or disable operation for one or more specified signaling routines of the MGC routine, the SIP routine, the SBC routine, the PTT routine, the H.323 routine, the WAN compression routine, and the CALE routine, wherein the user determines the enable or disable operation for one or more specified signaling routines of the MGC routine, the SIP routine, the SBC routine, the PTT routine, the H.323 routine, the WAN compression routine, and the CALE routine;

performing the configuration operation of the configuration command, wherein the configuration operation enables or disables the one or more specified signaling routines;

processing the signaling communication with a Media Gateway Controller (MGC) routine if appropriate;

processing the signaling communication with a Session Initiation Protocol (SIP) routine if appropriate;

processing the signaling communication with a Session Border Controller (SBC) routine if appropriate;

processing the signaling communication with a Push-To-Talk (PTT) routine if appropriate;

processing the signaling communication with a H.323 routine if appropriate;

processing the signaling communication with a Wide Area Network (WAN) compression routine if appropriate; and processing the signaling communication with a Communication Assistance for Law Enforcement (CALE) routine if appropriate.

8. The method of claim 7, with the receiving comprising receiving the configuration command through an operator interface of the comprehensive signaling node.

9. The method of claim 7, further comprising collecting and storing operational data from the MGC routine, the SIP routine, the SBC routine, the PTT routine, the H.323 routine, the WAN compression routine, and the CALE routine.

10. The method of claim 7, further comprising:

collecting and storing operational data from the MGC routine, the SIP routine, the SBC routine, the PTT routine, the H.323 routine, the WAN compression routine, and the CALE routine;

receiving a report command; and generating and transmitting a report including operational data specified in the report command.

11. The method of claim 7, further comprising the comprehensive signaling node performing billing operations for the MGC routine, the SIP routine, the SBC routine, the PTT routine, the H.323 routine, the WAN compression routine, and the CALE routine.

12. The method of claim 7, further comprising the comprehensive signaling node performing provisioning operations for the MGC routine, the SIP routine, the SBC routine, the PTT routine, the H.323 routine, the WAN compression routine, and the CALE routine.

13. A computer-readable medium having instructions stored thereon for operating a comprehensive signaling node for transmitting and receiving signaling communications between a communication network and a communication device, wherein the communication device is operated by a user, wherein the instructions, when executed by a processing system, direct the processing system to receive a signaling communication;

to receive a configuration command in the comprehensive signaling node, with the configuration command specifying an enable or disable operation for one or more specified signaling routines of the MGC routine, the SIP routine, the SBC routine, the PTT routine, the H.323 routine, the WAN compression routine, and the CALE routine, wherein the user determines the enable or disable operation for one or more specified signaling routines of the MGC routine, the SIP routine, the SBC routine, the PTT routine, the H.323 routine, the WAN compression routine, and the CALE routine;

to perform the configuration operation of the configuration command, wherein the configuration operation enables or disables the one or more specified signaling routines; and to process the signaling communication with a Media Gateway Controller (MGC) routine if appropriate, to process the signaling communication with a Session Initiation Protocol (SIP) routine if appropriate, to process the signaling communication with a Session Border Controller (SBC) routine if appropriate, to process the signaling communication with a Push-To-Talk (PTT) routine if appropriate, to process the signaling communication with a H.323 routine if appropriate, to process the signaling communication with a Wide Area Network (WAN) compression routine if appropriate, or to process the signaling communication with a Communication Assistance for Law Enforcement (CALE) routine if appropriate.

14. The instructions of claim 13, wherein the instructions receive the configuration command through an operator interface of the comprehensive signaling node.

15. The instructions of claim 13, wherein the instructions are further configured to direct the processing system to collect and store operational data from the MGC routine, the SIP routine, the SBC routine, the PTT routine, the H.323 routine, the WAN compression routine, and the CALE routine.

16. The instructions of claim 13, wherein the instructions are further configured to direct the processing system to collect and store operational data from the MGC routine, the SIP routine, the SBC routine, the PTT routine, the H.323 routine, the WAN compression routine, and the CALE routine, receive a report command, and generate and transmit a report including operational data specified in the report command.

17. The instructions of claim 13, wherein the instructions are further configured to direct the processing system to perform billing operations for the MGC routine, the SIP routine, the SBC routine, the PTT routine, the H.323 routine, the WAN compression routine, and the CALE routine.

18. The instructions of claim 13, wherein the instructions are further configured to direct the processing system to perform provisioning operations for the MGC routine, the SIP routine, the SBC routine, the PTT routine, the H.323 routine, the WAN compression routine, and the CALE routine.

* * * * *